United States Patent
Lee

(10) Patent No.: US 12,188,576 B2
(45) Date of Patent: Jan. 7, 2025

(54) METHOD AND APPARATUS FOR DIAGNOSING ABNORMAL STATE OF VALVE

(71) Applicant: VOLVO CONSTRUCTION EQUIPMENT AB, Eskilstuna (SE)

(72) Inventor: Eun Byeol Lee, Gyeongsangnam-do (KR)

(73) Assignee: VOLVO CONSTRUCTION EQUIPMENT AB, Eskilstuna (SE)

(*) Notice: Subject to any disclaimer, the term of this patent is extended or adjusted under 35 U.S.C. 154(b) by 705 days.

(21) Appl. No.: 17/294,919

(22) PCT Filed: Nov. 19, 2018

(86) PCT No.: PCT/KR2018/014223
§ 371 (c)(1),
(2) Date: May 18, 2021

(87) PCT Pub. No.: WO2020/105744
PCT Pub. Date: May 28, 2020

(65) Prior Publication Data
US 2022/0018460 A1    Jan. 20, 2022

(51) Int. Cl.
*F16K 37/00*    (2006.01)

(52) U.S. Cl.
CPC ............... *F16K 37/0083* (2013.01)

(58) Field of Classification Search
None
See application file for complete search history.

(56) References Cited

U.S. PATENT DOCUMENTS

| | | | |
|---|---|---|---|
| 6,111,514 A | 8/2000 | Cossins et al. | |
| 2010/0217545 A1* | 8/2010 | Rajagopalan | G01R 31/72 702/58 |

(Continued)

FOREIGN PATENT DOCUMENTS

| | | |
|---|---|---|
| CN | 102734541 A | 10/2012 |
| CN | 103454558 A | 12/2013 |

(Continued)

OTHER PUBLICATIONS

International Search Report and Written Opinion dated Aug. 7, 2019 in corresponding International PCT Application No. PCT/KR2018/014223, 8 pages.

(Continued)

*Primary Examiner* — Patrick Assouad
*Assistant Examiner* — Mark A Shabman
(74) *Attorney, Agent, or Firm* — Venable LLP; Jeffri A. Kaminski

(57) ABSTRACT

According to an embodiment of the present invention, there is provided a method of diagnosing an abnormal state of a valve including: applying a current having a predetermined intensity to a valve; estimating a resistance value of the valve on the basis of an intensity of a feedback current from the valve according to the application of the current and a voltage between both terminals of the valve; and when a difference between a resistance value of the valve estimated at a first time point and a resistance value of the valve estimated at a second time point is greater than or equal to a threshold, determining that abnormality has occurred in the valve.

4 Claims, 3 Drawing Sheets

(56) References Cited

U.S. PATENT DOCUMENTS

2015/0014561 A1 1/2015 Akazaki et al.
2016/0291075 A1 10/2016 Sommansson

FOREIGN PATENT DOCUMENTS

| CN | 104204637 | A | | 12/2014 | | |
|----|-----------|---|---|---------|---|---|
| CN | 105974260 | A | | 9/2016 | | |
| DE | 102014216610 | A1 | * | 2/2016 | ............. | G01R 31/06 |
| DE | 102016203604 | A1 | | 9/2017 | | |
| JP | 2009019683 | A | | 1/2009 | | |
| WO | 0048157 | A1 | | 8/2000 | | |

OTHER PUBLICATIONS

Chinese Office Action dated Jan. 11, 2023 in corresponding Chinese Patent Application No. 201880099570.7, 13 pages.
European Communication pursuant to Article 94(3) dated Mar. 22, 2024 in corresponding European Patent Application No. 18940522.8, 9 pages.

* cited by examiner

[Fig. 1]
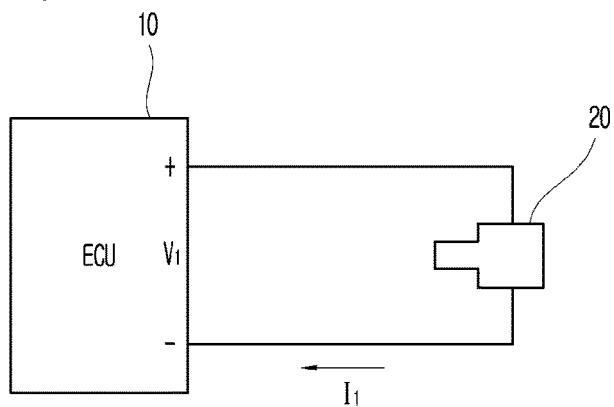
[Fig. 2]
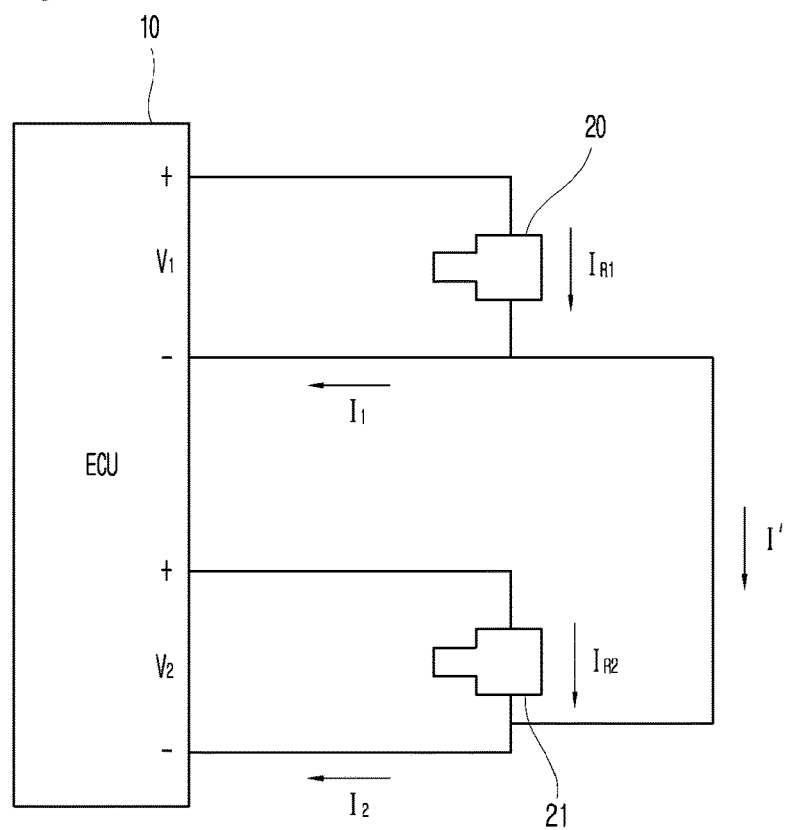
[Fig. 3]
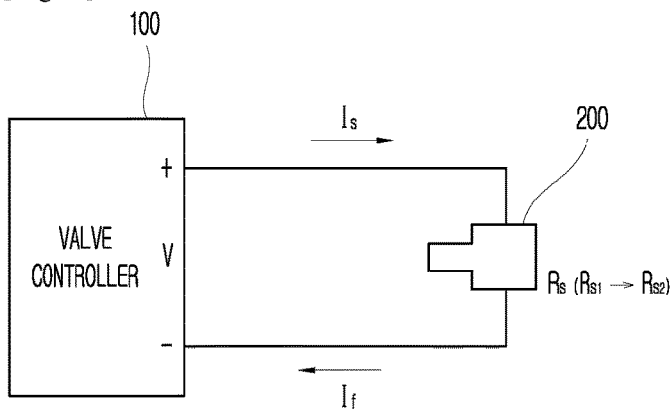

[Fig. 4]
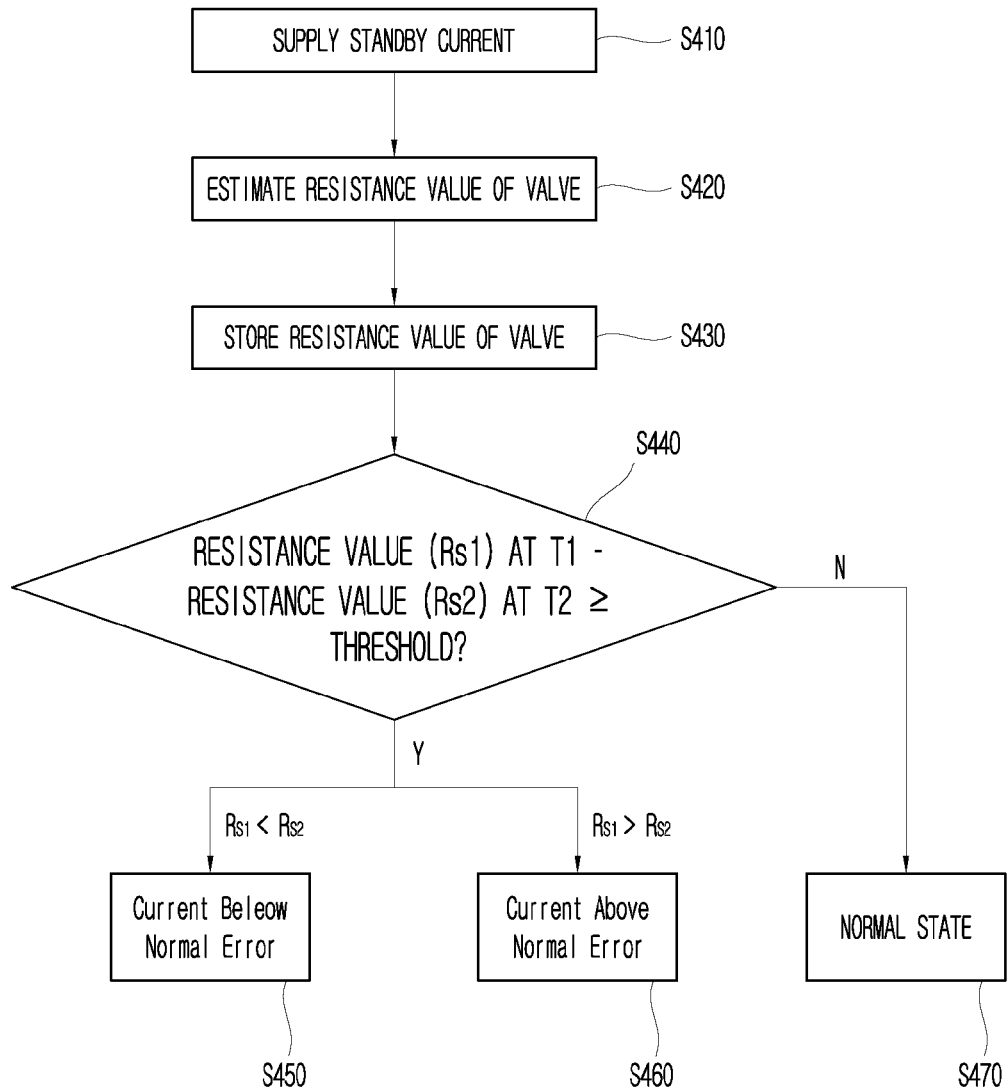
[Fig. 5]
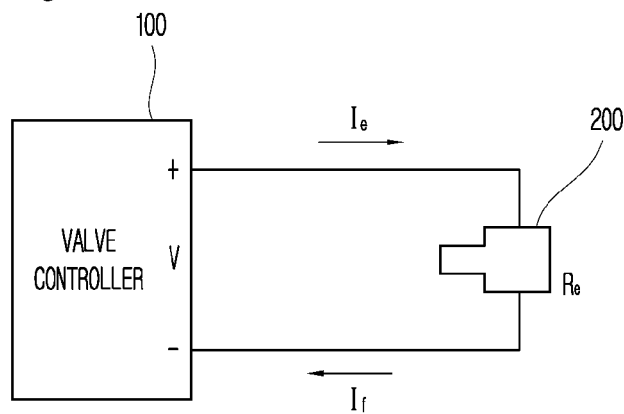

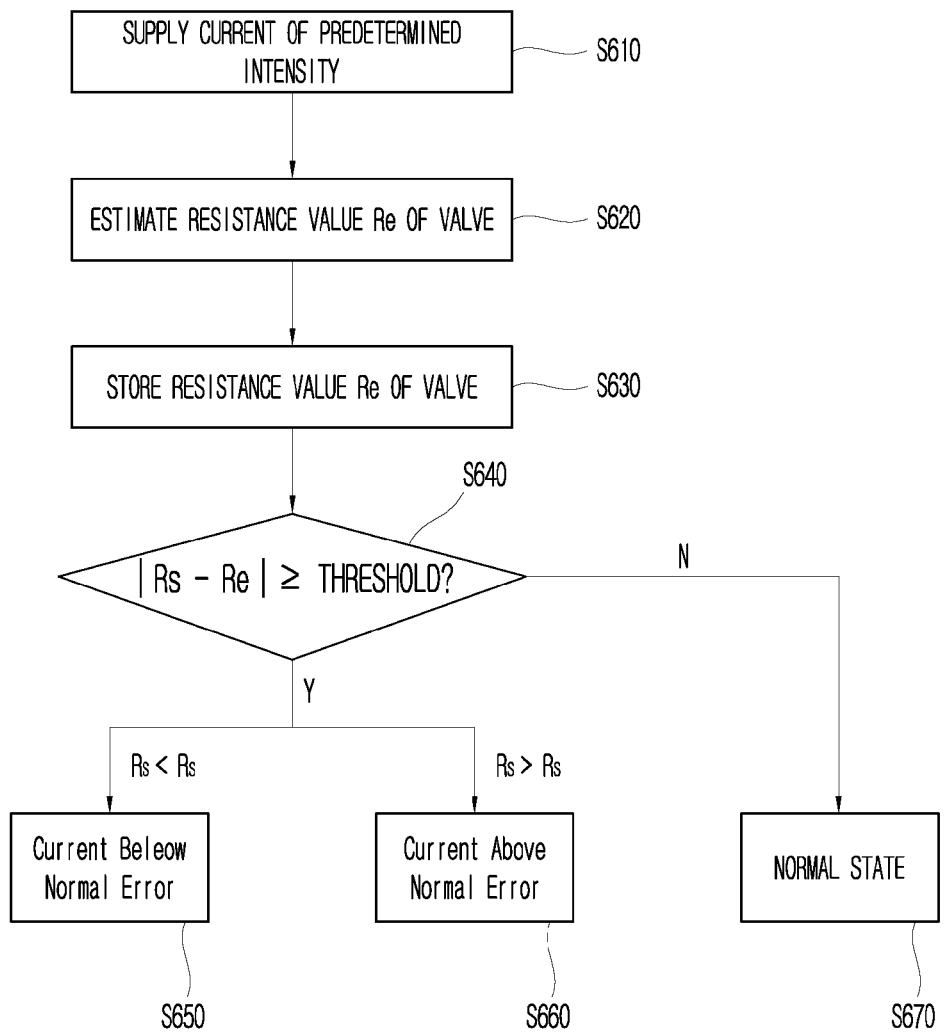

METHOD AND APPARATUS FOR DIAGNOSING ABNORMAL STATE OF VALVE

CROSS-REFERENCE TO RELATED APPLICATIONS

This application is a U.S. National Stage application of PCT/KR2018/014223, filed Nov. 19, 2018, and published on May 28, 2020, as WO 2020/105744 A1, all of which is hereby incorporated by reference in its entirety.

TECHNICAL FIELD

The present invention relates to a method and apparatus for diagnosing abnormal state of a valve.

BACKGROUND ART

In recent years, as the performance of electronic valves has been remarkably improved, many attempts have been made to remove and replace mechanical type hydraulic spool valves used in a hydraulic system of existing construction machines with the electronic valves.

Conventional hydraulic spool valves cannot secure the independency of valves whereas the electronic valves enable an independent valve system to be implemented. The independent valve technology with electronic valves applied thereto is referred to as an independent metering valve technology (IMVT).

An IMVT EXC machine contains and controls approximately 40 electronic hydraulic proportional valves (EHPVs) to control the direct operation of the machine, i.e., access and movement of the machine.

The EHPV is controlled by a pulse width modulation (PWM) signal provided from electronic control unit (ECU). FIG. 1 is a circuit diagram for describing an operation of an ECU to control an EHPV.

Referring to FIG. 1, an ECU 10 determines a current value to be applied to an EHPV 20 by controlling a voltage $V_1$ between both terminals of the EHPV 20 with a PWM signal. A current passing through the EHPV is re-input to the ECU 10 as a feedback current $I_1$.

The ECU 10 may estimate a current resistance value $R_1$ of the EHPV 20 through the voltage $V_1$ between both terminals of the EHPV 20 and the intensity of the feedback current $I_1$.

$$(R_1 = V_1/I_1)$$

Since the EHPV 20 has a unique resistance characteristic, the resistance value has to be within a range between a first value (minimum value) and a second value (maximum value). When the resistance value estimated by the ECU 10 using the above-described method is smaller than the first value or greater than the second value, it may be determined that an abnormality has occurred.

However, such a method of diagnosing an abnormality for an EHPV is not possible to make an accurate diagnosis in some situations.

FIG. 2 is a circuit diagram illustrating a case where a diagnosis of abnormality is not possible.

Referring to FIG. 2, it is assumed that resistance values of first and second EHPVs 20 and 21 fall within a normal range but negative (−) terminals of the first and second EHPVs 20 and 21 are shorted to each other.

In this case, assuming that the ECU 10 controls a voltage $V_1$ between both terminals of the first EHPV 20 and a voltage $V_2$ between both terminals of the second EHPV 21, part of a current $I_{R1}$ flowing through the first EHPV 20 or part of a current $I_{R2}$ flowing through the second EHPV 21 may flow through the shorted line I'.

For example, when part of the current $I_{R1}$ flowing through the first EHPV 20 flows into the negative (−) terminal of the second EHPV 21 via the shorted line, the intensity of a first feedback current $I_1$ input to the ECU 10 may be reduced as compared to a case where no short circuit has occurred and the intensity of a second feedback current $I_2$ may be increased as compared to a case where no short circuit has occurred.

Therefore, the resistance value of the first EHPV 20, which is estimated on the basis of the first feedback current $I_1$, may be increased as compared to a case where no short circuit has occurred and the resistance value of the second EHPV 21, which is estimated on the basis of the second feedback current $I_2$, may be reduced as compared to a case where no short circuit has occurred.

Since the ECU 10 recognizes the first feedback current $I_1$ having an intensity smaller than that of the current $I_{R1}$ actually flowing through the first EHPV 20, the ECU 10 may increase the voltage $V_1$ between both terminals of the first EHPV 20 in terms of PWM control. However, in practice, since the resistance value of the first EHPV 20 is within a normal range, the control of the ECU 10 causes malfunction.

That is, in the case as shown in FIG. 2, the ECU cannot accurately diagnose an abnormal state of the EHPV.

Therefore, there is a need for a technology that can accurately determine an abnormal state of the EHPV under any circumstance.

DISCLOSURE OF INVENTION

Technical Problem

In order to solve the above-described drawbacks, one objective of the present invention is to provide a method and apparatus, of which diagnostic accuracy for an abnormal state of a valve may be improved even when an external abnormal condition for the valve is present.

Another objective of the present invention is to allow diagnosis of an abnormal state of a valve even when a machine is in an off state.

Solution to Problem

One aspect of the present invention provides a method of diagnosing an abnormal state of a valve, including: applying a current having a predetermined intensity to a valve; estimating a resistance value of the valve on the basis of an intensity of a feedback current from the valve according to the application of the current and a voltage between both terminals of the valve; and when a difference between a resistance value of the valve estimated at a first time point and a resistance value of the valve estimated at a second time point is greater than or equal to a threshold, determining that abnormality has occurred in the valve.

The intensity of the current may be smaller than a minimum intensity of current required by the valve to operate.

The applying of the current may include applying a first current and a second current having different intensities at the first time point and the second time point, respectively.

An intensity of the first current may be smaller than a minimum intensity of current required by the valve to operate and an intensity of the second current is greater than the minimum intensity of current required by the valve to operate Another aspect of the present invention provides an apparatus for diagnosing an abnormal state of a valve, comprising a valve controller configured to estimate a resistance value of a valve by applying a current having a predetermined intensity to the valve and determine that abnormality has occurred in the valve when a difference between resistance values of valve estimated at different points in time is greater than or equal to a threshold.

Advantageous Effects of Invention

According to one embodiment of the present invention, an abnormal state of a valve is diagnosed using a difference between resistance values of the valve measured at different points in time, rather than using a resistance value of the valve estimated at a specific point in time, so that it is possible to improve diagnostic accuracy for the abnormal condition of the valve.

In addition, according to one embodiment of the present invention, it is possible to diagnose an abnormal state of a valve even when a machine is in an off state.

BRIEF DESCRIPTION OF DRAWINGS

FIG. 1 is a diagram illustrating a general valve control system.

FIG. 2 is a diagram for describing an abnormal condition that may occur in a valve control system.

FIG. 3 is a diagram illustrating an apparatus for controlling a valve and diagnosing abnormality of the valve according to one embodiment of the present invention.

FIG. 4 is a flowchart for describing a process of diagnosing an abnormal state of a valve according to one embodiment of the present invention.

FIG. 5 is a diagram illustrating an apparatus for controlling a valve and diagnosing abnormality of the valve according to an additional embodiment of the present invention.

FIG. 6 is a flowchart for describing a process of diagnosing abnormal state of a valve according to an additional embodiment of the present invention.

MODE FOR THE INVENTION

Hereinafter, exemplary embodiments of the present invention will be described more fully with reference to the accompanying drawings so as to be easily practiced by those skilled in the art to which the present invention pertains. However, the present invention is not limited to the exemplary embodiments described therein, but may also be embodied in other forms. Also, irrelevant details have been omitted from the drawings for increased clarity and conciseness, and the same or like elements are indicated by the same reference numerals throughout the specification. In addition, sizes and thicknesses of components in the drawings are arbitrarily illustrated for convenience of explanation, and thus the following embodiments are not limited thereto.

Throughout the specification, it will be understood that when an element is referred to as being "connected" or "coupled" to another element, it may be directly connected or coupled thereto or intervening elements may be present.

Hereinafter, embodiments of the present invention will be described in detail with reference to the accompanying drawings.

FIG. 3 is a diagram illustrating an apparatus for controlling a valve and diagnosing abnormality of the valve according to one embodiment of the present invention.

Referring to FIG. 3, the apparatus for diagnosing abnormality of a valve according to one embodiment of the present invention includes a valve controller 100 and a valve 200. It can be seen that the apparatus has the same hardware configuration as the conventional system described with reference to FIGS. 1 and 2.

That is, according to the present invention, it is possible to accurately diagnose abnormality of a valve without changing the hardware configuration of the existing valve control system.

Referring back to FIG. 3, the valve controller 100 controls the overall operation of the valve 200 and diagnoses an abnormal state of the valve 200.

The valve controller 100 applies current having a predetermined intensity to the valve 200 by controlling a voltage between both terminals of the valve 200 through pulse width modulation (PWM) control. The valve controller 100 may have at least three states including an off state, a standby state, and an on state. The off state indicates that a machine on which the system illustrated in FIG. 3 is mounted is in an off state, and in this case, the valve controller 100 does not provide any electronical signal to the valve 200. The standby state indicates that the valve 200 is provided with a standby current $I_s$ after the machine enters an on state. The intensity of the standby current $I_s$ may be smaller than the minimum intensity of a current required by the valve 200 to operate. Lastly, the on state indicates that the valve 200 is provided with a current having the intensity just large enough to cause the valve 200 to operate.

The valve controller 100 according to the embodiment of the present invention may accurately diagnose an abnormal state by detecting a change in resistance value of the valve 200 even in the off state and in the standby state. A diagnostic method will be described in detail below.

The valve 200 is a valve that operates under the control of the valve controller 100, and may be implemented as a valve, that is, an electronic hydraulic proportional valve (EHPV) which controls a pressure, flow rate, or direction of a hydraulic system proportionally in response to an electrical signal received from the valve controller. However, the valve 200 according to one embodiment of the present invention should be understood as including other valves, in addition to the EHPV, as long as the valves receive an electrical signal and perform an operation according to the electrical signal.

The valve 200 is made of a conductor, and resistance of the conductor may vary with the temperature. When the valve 200 has a positive (+) temperature coefficient, a resistance value increases as the temperature increases. A temperature of the valve 200 may vary with the change in oil temperature inside equipment, change in a current value directly applied to the valve 200, change in an atmospheric temperature, or the like. Generally, the temperature gradually changes with time, and it can be said that a rate of temperature change is not abrupt. Therefore, on the premise that the change in the resistance value of the valve 200 in accordance with the temperature change cannot be abrupt, an abnormal state of the valve 200 may be accurately diagnosed.

FIG. 4 is a flowchart for describing a method of diagnosing an abnormal state of a valve according to one embodiment of the present invention.

Hereinafter, a method of diagnosing abnormality of a valve according to one embodiment of the present invention will be described with reference to FIGS. 3 and 4.

As described above, the valve controller 100 operates differently in an off state, standby state, and on state of the machine, and may supply a standby current $I_s$ to the valve 200 in the standby state (S410).

The standby current $I_s$ may have a small intensity such that the valve 200 cannot operate, and may have, for example, an intensity of approximately 150 mA.

After the valve controller 100 supplies the standby current $I_s$, the valve controller 100 may estimate a resistance value $R_s$ of the valve 200 on the basis of an intensity of a feedback current $I_f$ input to the valve controller 100 from the valve 200 and a voltage V between both terminals of the valve 200 (S420).

$$R_s = V/I_f$$

The valve controller estimates the resistance value $R_s$ of the valve at a predetermined period or continuously using the above-described method, and stores the estimated resistance values $R_s$ of the valve 200 in a memory (S430).

As described above, since the resistance value $R_s$ of the valve 200 cannot change abruptly, when the estimated resistance value $R_s$ of the valve 200 is changed drastically within a short period of time, it may be determined that abnormality has occurred in the valve 200.

In order to make such a determination, the valve controller 100 determines whether a difference between a resistance value $R_{s1}$ of the valve estimated at a first time point T1 and a resistance value $R_{s2}$ estimated at a second time point T2 after the first time point T1 is greater than or equal to a predetermined threshold (S440). An interval between the first time point T1 and the second time point T2 and the threshold may be preset values. In addition, the threshold may be approximately proportional to the interval between the first time point T1 and the second time point T2. For example, when an interval between the first time point T1 and the second time point T2 is one second, the threshold may be set to 3Ω.

When it is determined that the change of the resistance value $R_s$ of the valve 200 is greater than or equal to the threshold, it may be determined that abnormality has occurred in the valve 200.

Specifically, when the change of the resistance value $R_s$ of the valve 200 is greater than or equal to the threshold and the change is "increase," error information (current below normal error) indicating that an intensity of current is below a normal level may be output (S450), and when the change is "decrease," error information (current above normal error) indicating that an intensity of current is above the normal level may be output (S460).

Meanwhile, when the change of resistance value $R_s$ of the valve 200 during a predetermined time interval is smaller than or equal to the threshold, it may be determined that the valve 200 is in a normal state (S470).

FIG. 5 is a diagram illustrating an apparatus for controlling a valve and diagnosing abnormality of the valve according to an additional embodiment of the present invention.

Referring to FIG. 5, it can be seen that a configuration is similar to that shown in FIG. 3.

FIG. 6 is a flowchart for describing a method of diagnosing abnormality of a valve according to an additional embodiment of the present invention.

Hereinafter, a method of diagnosing abnormality of a valve according to one embodiment of the present invention will be described with reference to FIGS. 3, 5, and 6.

When the valve controller 100 does not provide any electrical signal to the valve 200, it is not possible to diagnose an abnormal state of the valve 200. That is, generally, in an off state of the machine, an abnormal state of the valve 200 cannot be diagnosed.

The present embodiment is directed to diagnosing an abnormal state of the valve even when the machine in an off state. First, when the machine is in an off state, the valve controller 100 supplies a current $I_e$ having a predetermined intensity to the valve 200 (S610).

At this time, the intensity of the current may be similar or equal to a minimum current intensity that causes the valve 200 to operate.

After the valve controller 100 supplies the current $I_e$ having such an intensity, the valve controller 100 may estimate a resistance value Re of the valve 200 on the basis of a feedback current $I_f$ input to the valve controller 100 from the valve 200 and a voltage V between both terminals of the valve 200 (S620). The estimated resistance value $R_e$ is stored in a memory (S630).

When the machine is in a standby state, the valve controller 100 supplies a standby current $I_s$ to the valve 200, and the resistance value $R_s$ of the valve 200 is estimated on the basis of the feedback current $I_f$ at the time of supplying the standby current Is, as described above.

The valve controller 100 compares the estimated resistance value $R_e$ of the valve at the time of the off state of the machine and the estimated resistance value $R_s$ of the valve at the time of the standby state and determines whether a difference therebetween is greater than or equal to a threshold (S640).

The threshold in operation S640 may be, for example, 3Ω.

When it is determined that the difference between the estimated resistance value $R_e$ of the valve at the off state of the machine and the estimated resistance value $R_s$ of the valve at the time of the standby state is greater than or equal to the threshold, it may be determined that abnormality has occurred in the valve 200.

Specifically, when the estimated resistance value $R_e$ of the valve at the time of the off state of the machine is greater than the estimated resistance value $R_s$ of the valve at the time of the standby state by the threshold or more, error information (current below normal error) indicating that the intensity of current is below a normal level may be output (S650), and when the estimated resistance value $R_e$ of the valve at the time of the off state of the machine is smaller than the estimated resistance value $R_s$ of the valve at the time of the standby state by the threshold or more, error information (current above normal error) indicating that the intensity of current is above the normal level may be output (S660).

Meanwhile, the change of the resistance value of the valve 200 is smaller than or equal to the threshold, it may be determined that the valve 200 is in a normal state (S670).

According to the embodiments of the present invention, since an abnormal state of the valve is diagnosed on the basis of the change of estimated resistance value of the valve, it is possible to increase diagnostic accuracy for the abnormal condition of the valve.

Specifically, in the case as described with reference to FIG. 2, that is, even when short-circuiting has occurred among a plurality of valves, since the estimated resistance value of the valve does not change, it may be determined that the valve itself does not have an abnormal condition.

In addition, according to the embodiments of the present invention, it is possible to diagnose an abnormal condition of the valve even when the machine is in an off state.

The foregoing description of the invention is for illustrative purposes, a person having ordinary skilled in the art will appreciate that other specific modifications can be easily made without departing from the technical spirit or essential features of the invention.

Therefore, the foregoing embodiments should be regarded as illustrative rather than limiting in all aspects. For example, each component described as being of a single type can be implemented in a distributed manner. Likewise, components described as being distributed can be implemented in a combined manner.

The scope of the present invention is not defined by the detailed description as set forth above but by the accompanying claims of the invention. It should also be understood that all changes or modifications derived from the definitions and scopes of the claims and their equivalents fall within the scope of the invention.

The invention claimed is:

1. A method of diagnosing an abnormal state of a valve, comprising:
    obtaining a state of a target equipment comprising a valve, varied by an electrical signal;
    applying, by a valve controller, a current having a predetermined intensity to the valve, corresponded to the state of the target equipment, wherein the valve has two terminals;
    estimating a resistance value of the valve at a first point in time and a second point in time on the basis of an intensity of a feedback current from the valve according to the application of the current and a voltage between both terminals of the valve; and
    when a difference between a resistance value of the valve estimated at the first time point and a resistance value of the valve estimated at the second time point is greater than or equal to a threshold, determining that abnormality has occurred in the valve,
    wherein an interval between the first time point and the second time point is preset values,
    wherein the valve controller applies the current by controlling the voltage between the terminals of the valve through pulse width modulation (PWM) control,
    wherein, if the state of the target equipment is an off state, the applying of the current includes applying a first current and a second current having different intensities at the first time point and the second time point, respectively, and wherein the first point in time is at the time of standby state and the second point in time is at the time of the off state.

2. The method of claim 1, wherein the intensity of the current is smaller than a minimum intensity of current required by the valve to operate,
    and wherein the threshold is proportional to the interval between the first time point and the second time point.

3. The method of claim 1, wherein an intensity of the first current is smaller than a minimum intensity of current required by the valve to operate and an intensity of the second current is greater than the minimum intensity of current required by the valve to operate.

4. An apparatus for diagnosing an abnormal state of a valve, comprising a valve controller configured to:
    obtain a state of a target equipment comprising a valve, varied by an electrical signal;
    estimate a resistance value of a valve having two terminals by applying, at different points in time, a current having a predetermined intensity to the valve, corresponded to the state of the target equipment, and
    determine that abnormality has occurred in the valve when a difference between resistance values of valve estimated at different points in time is greater than or equal to a threshold,
    wherein an interval between the different points in time is preset values,
    wherein the valve controller applies the current by controlling a voltage between the terminals of the valve through pulse width modulation (PWM) control,
    wherein, if the state of the target equipment is an off state, the applying of the current includes applying a first current and a second current having different intensities at the first time point and the second time point, respectively, and wherein the first point in time is at the time of standby state and the second point in time is at the time of the off state.

* * * * *